US006246553B1

(12) United States Patent
Biskeborn

(10) Patent No.: US 6,246,553 B1
(45) Date of Patent: Jun. 12, 2001

(54) SHIELDED MAGNETORESISTIVE HEAD WITH CHARGE CLAMP

(75) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/204,321

(22) Filed: Dec. 2, 1998

(51) Int. Cl.[7] ................................................. G11B 5/127
(52) U.S. Cl. ................................................. 360/323; 360/319
(58) Field of Search .................................... 360/121, 126, 360/323, 319

(56) References Cited

U.S. PATENT DOCUMENTS

| 4,802,043 | 1/1989 | Sato et al. ...................... 360/113 |
| 4,987,514 | 1/1991 | Gailbreath et al. .............. 361/220 |
| 5,375,022 | 12/1994 | Gill et al. ........................ 360/113 |
| 5,539,598 | 7/1996 | Denison et al. ................. 360/113 |
| 5,557,492 | 9/1996 | Gill et al. ........................ 360/113 |
| 5,748,412 | 5/1998 | Murdock et al. ................ 360/113 |
| 5,805,390 | 9/1998 | Takeura ........................... 360/113 |
| 5,978,181 | 11/1999 | Niijima et al. .................. 360/113 |

FOREIGN PATENT DOCUMENTS

| 0457278A2 | 11/1991 | (EP) . |
| 065137A1 | 5/1995 | (EP) . |
| 61077114 | 4/1986 | (JP) . |
| 61-96508 | 5/1986 | (JP) . |
| 6-111250 | 4/1994 | (JP) . |
| 7-73419 | 3/1995 | (JP) . |
| 8-45033 | 2/1996 | (JP) . |
| 10-55518 | 2/1998 | (JP) . |

*Primary Examiner*—Allen T. Cao
(74) *Attorney, Agent, or Firm*—G. Marlin Knight

(57) ABSTRACT

An MR or GMR head is described which solves a head spiking problem with a charge clamp structure which provides a noninsulating electrical path from a conducting shield to an MR element lead to prevent charge buildup. Various embodiments of the charge clamp which are described include a center-tapped resistor which provides an electrical path from the S2 shield (and optionally the S1 shield) to both leads of the MR element to form a self-tracking clamp. Alternatively the resistance configurations described can be duplicated for each shield. A storage system using the invention connects the system's bias circuitry to apply a dc bias voltage on the MR elements leads which in turn are electrically connected to the shield.

18 Claims, 8 Drawing Sheets

SHIELDED MAGNETORESISTIVE HEAD WITH CHARGE CLAMP

BACKGROUND OF THE INVENTION

1. Field of the Invention

This invention relates in general to magnetic heads which are used to read and/or write magnetic data onto a magnetic film, and more particularly to heads using magnetoresistive materials and methods for making these heads.

2. Description of Related Art

Progress in magnetic data recording requires higher densities which in turn require increased sensitivity of the transducers (heads) used to read and write the magnetic signals. Noise reduction and protection of the heads from transient events and are important goals for the design of the heads. Many read heads operate using magnetoresistive materials, hence are called MR heads. The elements of a basic prior art MR read head with two shields are illustrated in FIG. 1 which shows a cut away view of the layers found in one type of prior head for use in a disk drive. As is typical this head has separate structures for the read and write functions. The portion performing the write operation of the overall head is often called the write element or the write head. The write element in FIG. 1 is an inductive head. The reading function is performed by elements which are called the MR head. A permeable magnetic layer 111 which acts as a first shield (S1) is deposited on an insulating layer 101 which is supported by a substrate layer (not shown). A first insulation layer 103 follows. The magnetoresistive (MR) element 114 and its leads (not shown) are deposited onto the insulation layer 103. A second insulation layer 104 follows in effect sandwiching the MR element 114 between the two insulating layers. On top of the second insulating layer, a permeable magnetic material is deposited forming a second shield (S2) 222. The elements which function together as an inductive write head include additional insulating material 107 and the induction coil 112 which is deposited in insulating layer 110. Layer 109 acts a pole piece for the write head. The S2 layer 222 serves a dual role by acting as the other pole piece in this particular type of head, but other designs including tape heads use separate layers for these functions.

The head of FIG. 1 is intended for use in a disk drive, but the basic elements and functions are the same for heads intended for tape drives. Tape heads are generally constructed with the read and write elements arranged side-by-side and S2 does not serve a dual role as a pole piece.

FIG. 2 illustrates a simplified cutaway view of the read elements in another type of prior art MR head called a ferrite head. Layer 61 is composed of ferrite with layer 61 acting as the S1 shield and layer 65 is a magnetic or nonmagnetic closure element. Shield S2 222 and the MR element 114 are surrounded by insulating material 67. The MR lead 63 (which can be a conductive material such as gold) is shown connecting to the bias supply 17. MR heads such as the type illustrated in FIG. 2 have only one metal shield. The magnetic media travels past the gap formed by the two shields which act to block the magnetic field from the media outside of the gap. A constant dc bias current is applied to the MR element and the fluctuation in the voltage level across the MR element caused by the fluctuation of the resistance is the output signal.

FIG. 3 illustrates a simplified cutaway view of another type of prior art MR head. In this head the S1 shield is a separate element 111 as is the S2 shield 222. The two shields do not need to be made from the same material. The two shields and the MR element 114 are surrounded by insulating material 67 which is deposited in several steps during the manufacturing process. The MR lead 63 is connected to the bias supply 17 as before.

There are many variations of MR head design which can be seen in prior art references such as U.S. Pat. No. 5,713,122. MR heads are currently used in disk drive systems and tape drives. Although heads in disk drives are packaged with a single read/write element pair in a unit, a tape head assembly will have a read/write element pair provided for each track in a multitrack system.

A particular noise phenomenon has been observed in data readback from magnetic tape with MR heads. In the following "MR heads" will be used to include heads using the giant magnetoresistive (GMR) effect as well the magnetoresistive effect. The output signal from the read head has been observed to contain very sharp spikes which approximate ideal pulses with very narrow width and broad spectral content. These spikes can be of either polarity and are distributed over a range of amplitudes. The output signal from a head is typically passed to a preamplifier then into an input channel which includes various filters, detectors, decoders, error correctors, etc.

The effect of the sharp spikes in the input channel signal is at least randomly dispersed, correctable single bit errors and at worst may interfere with detection of the media signal. The spikes can occur in the absence a recording signal or MR bias current, but appear to require media/head contact and relative motion.

There are schemes designed for esd protection of the elements, but these do not directly relate to the present problem. There have been proposals for and tests of heads with various schemes, such as connecting the MR shields to ground in disk heads via resistors. However, connecting the shields to ground via resistors might actually aggravate the spiking problem by building in a constant large MR-shield potential difference as the discussion below will show.

SUMMARY OF THE INVENTION

An MR head according the invention solves the head spiking problem with a charge clamp structure which provides an electrical path from a conducting shield to one or both of the MR element leads to prevent the buildup of large disruptive charges associated with the interaction of the MR element and the shield (which together can be modeled as a virtual capacitor). In one embodiment of the invention the charge clamp provides a resistive electrical path from a shield to both leads from the MR element to form a self-tracking clamp. Possible additional benefits of providing the electrical path from an MR element lead to the shield(s) include making the shield(s) more effective for EMI protection and generally protecting the MR element from high currents from other sources.

One embodiment of the invention uses a resistance connected between a lead of the MR element and an associated shield.

In another embodiment, a head with a single metal shield has a separate resistive path from the shield to each of the leads of the MR element. The two resistive paths may be implemented as a thin film structure which contacts both leads and has a central connection to the shield forming an approximately center-tapped resistor.

In another embodiment, a head with more than one conductive shield, has the shields electrically connected and then connected to one of the leads through a resistive path. Alternatively the resistance configuration can be duplicated for each shield.

In yet another embodiment, material separating the MR element and the shield is made from a material which is slightly more conductive than an insulating material to provide a resistive path for the charge.

A storage system according to the invention can include any embodiment of the MR head invention. The system's bias circuitry is connected to apply a dc bias voltage so that the S2 shield is connected to the proper lead of the MR element. Although the invention is well suited for use in tape storage system, it can be applied in disk drives or measurement apparatus where the heads are subjected to forces which cause charges to build up between the MR element and a shield which could include contact or near-contact recording using rigid or flexible disks.

BRIEF DESCRIPTION OF THE DRAWINGS

Referring to the drawings in which reference numbers represent corresponding parts throughout.

DETAILED DESCRIPTION OF THE INVENTION

In the following of several exemplary embodiments in which the invention may be practiced are described. The present invention provides methods and apparatus for preventing the noise spikes from occurring in the output an MR head by clamping the electrical potential and associated charge buildup in the head. The head is designed with means for eliminating the large charge buildup which suddenly discharges and may, among other effects, result in large amplitude, extremely narrow noise pulses that cause errors in decoding the data being read from the magnetic media using MR heads. Modeling and experiments suggest that pulses of the type observed result from localized discharges between the MR material and the shield(s). The MR material and the shield have a capacitance between them which will be referred to as a "virtual capacitor" or MR-shield capacitor. In prior art MR heads, the Applicant has determined that the noise spikes described above occur when the virtual capacitor suddenly discharges either when the voltage reaches a breakdown value or when the moving media, e.g. tape, initiates a discharge event. The discharge mechanism can be media assisted, is normally non-destructive and is not esd in the classic sense. The rubbing of the media over the head slowly charges (so-called 'tribocharges') the MR-shield capacitance (capacitor). When the virtual capacitor discharges, part of the stored charge flows through the MR element, causing an IR pulse in the output signal. The transducer (head) design of the invention limits charging of the MR-shield capacitor and so either reduces the amplitude below a threshold or eliminates the noise pulses.

Figure 4:
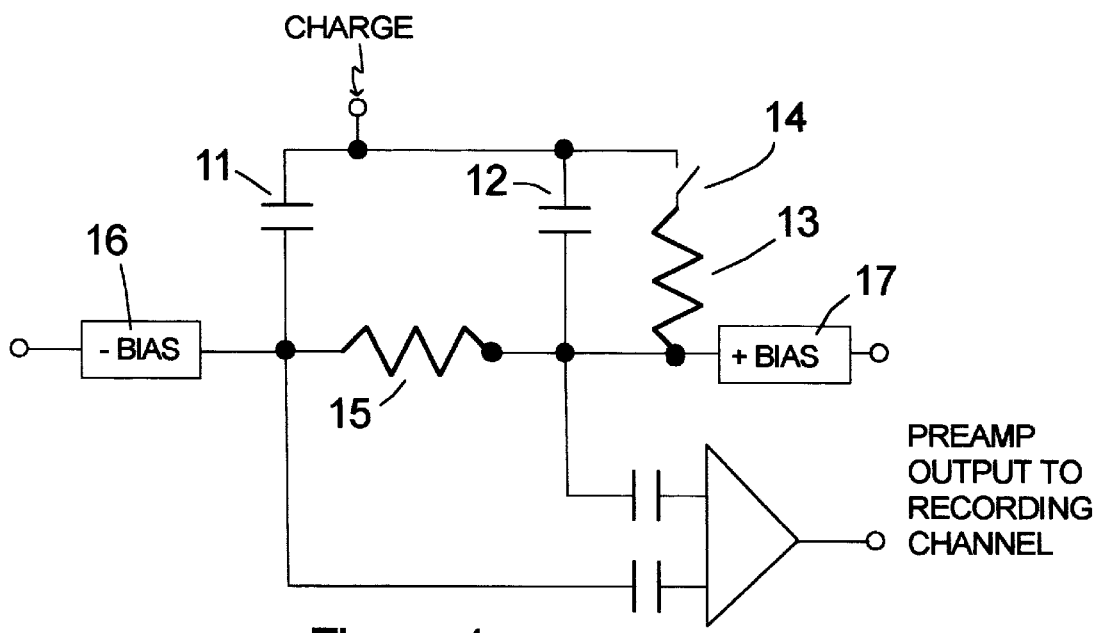
FIG. 4 illustrates a simple circuit model for an MR head and its associated components in a data storage system.

FIG. 4 is a circuit diagram which illustrates a simple model which is useful for understanding the origin of the noise spikes and the solution provided by the invention. The model includes the more positive 17 and more negative bias 16 connection points. Positive and negative are used relatively in this context simply to indicate that a DC bias current flow is induced in the MR element in a typical application in a storage system. The MR head is modeled as including capacitance 11 which is approximately one-half of the total MR-shield capacitance and is connected through the MR leads to the negative bias connection 16 and one of the differential inputs to the preamplifier. A second capacitance 12 in the MR head model which is approximately one-half of the total MR-shield capacitance is connects the more positive bias 17 point. Capacitances 11 and 12 have a common node in the shield. Capacitance 12 is in parallel with the series combination of resistance 13 and switch 14 which are used to model the charge/discharge cycle. Switch 14 when open allows capacitance 12 to charge. Discharge is modeled by switch 14 closing. When discharge occurs approximately 50% of the stored charge, i.e. the charge on capacitance 11, flows through the MR element on its way to resistance 13. It should be noted that the resistor 13 and switch 14 pair can be located in parallel with capacitance 11 to model the opposite polarity of pulse. The sign of the pulse is also reversed by changing the sign of the charge stored on capacitances 11 and 12.

Figure 5:
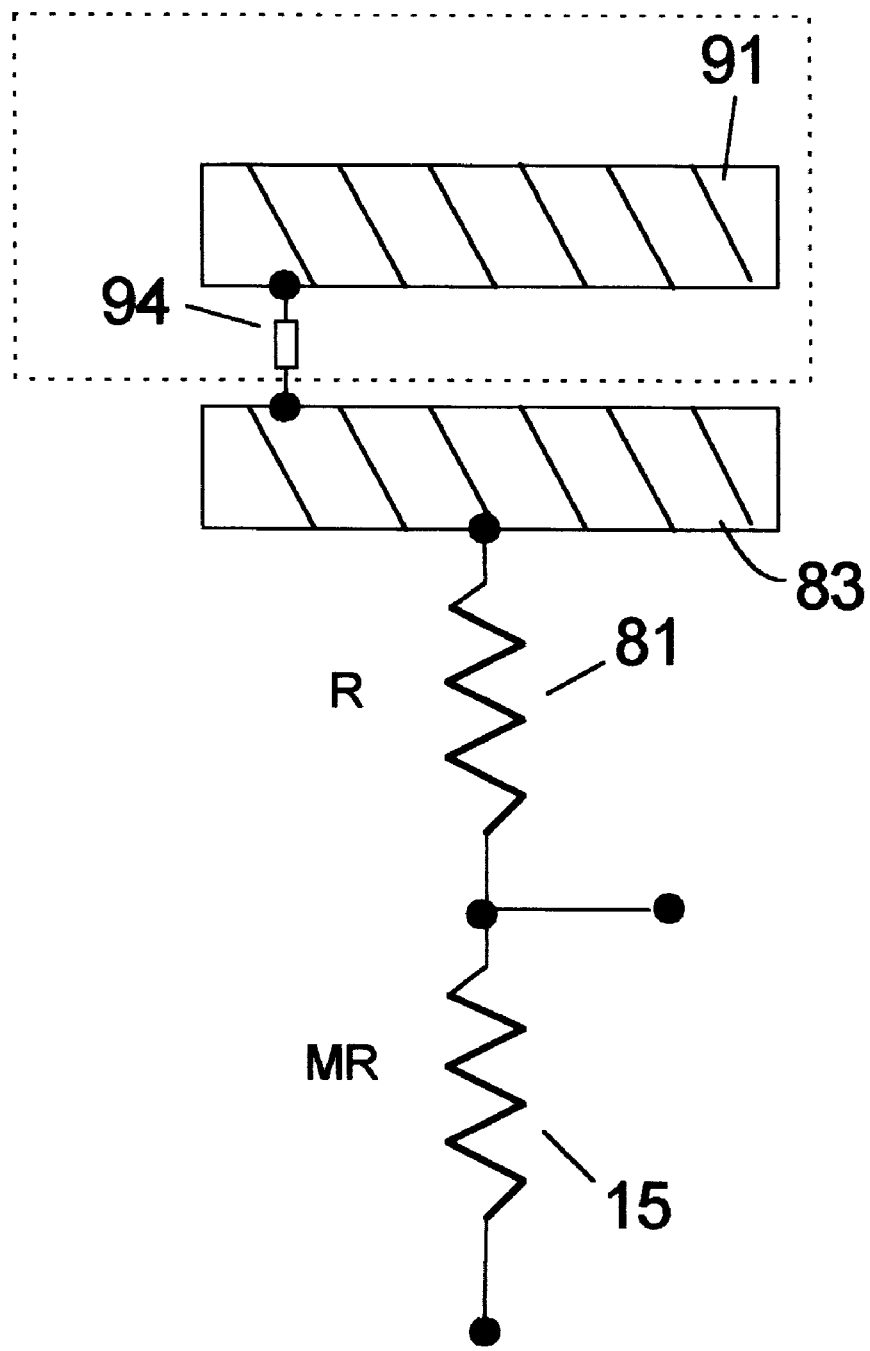
FIG. 5 illustrates a portion of a circuit model for an MR head according to one embodiment of the invention using a resistor from the shield to one lead of the MR element and its associated circuitry.

In a simple version of the invention, as illustrated in FIG. 5 a single, clamping resistor 81 connects the single conductive shield 83 to a lead of the associated MR element as illustrated by MR modeling resistance 15. If connection is to the positive lead, this ensures a constant, small potential difference between the MR and shield and also ensures that the MR element is everywhere equal to or more negative than the shields. This is preferred for corrosion protection especially in humid environments. If corrosion is not a significant issue, then the shield connection should be to the lead presented with the lowest impedance to signal return or ground when connected to the bias circuitry in the storage system. The connections shown can be replicated for a multiple element head.

Figure 6:
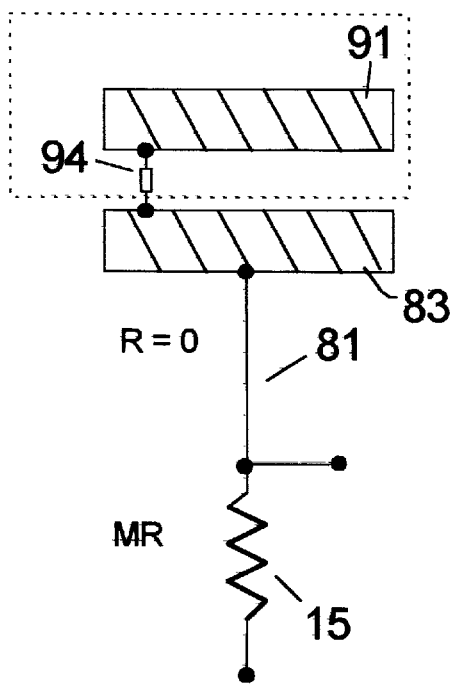
FIG. 6 illustrates a portion of a circuit model for an MR head according to one embodiment of the invention using a low or zero resistance path from the shield to one lead of the MR element and its associated circuitry.

FIG. 6 illustrates an embodiment of the invention similar to FIG. 5 but where the clamping resistor 81 is replaced by essentially a conductive connection, i.e. near zero resistance. This circuit model includes an embodiment of the invention where the shield material, which is conductive, directly contacts one of the leads. This direct contact can be achieved by forming a via or gap in the insulating layer separating the shield from the lead, by depositing the insulating layer in such a way that it does not cover all of the lead or by any other method. For this or any other embodiment the various methods and tools used in thin film and semiconductor can be used to make the needed connections as taught herein. The conductive and/or resistive connections described herein can be thin films, vertical vias or any other structures. The connections can be made at any level in the structure or at any step in the process; for example, the connections can be in a common plane or from above or below. Similarly, the deposition of the layers can simultaneously make the connections or the connections can be made subsequent to the deposition of the layers by milling, etching, etc. and depositing connecting materials. The materials used to achieve the needed electrical functions can likewise be selected using general principles. Thus, the materials can include metals, semiconductors and other conductors such as doped oxides.

Although it is preferred that the described electrical connections be made in the internal structures of the transducer, it is possible to make the connections external to the transducer if connecting pads to one or more of the shields are externalized. In this scenario the storage system would make the resistive or conductive connections to the shield(s) to implement the principles of the invention. This is not a preferred method, since noise, stray inductance, etc. in such connections could degrade performance of the transducer.

Figure 7:
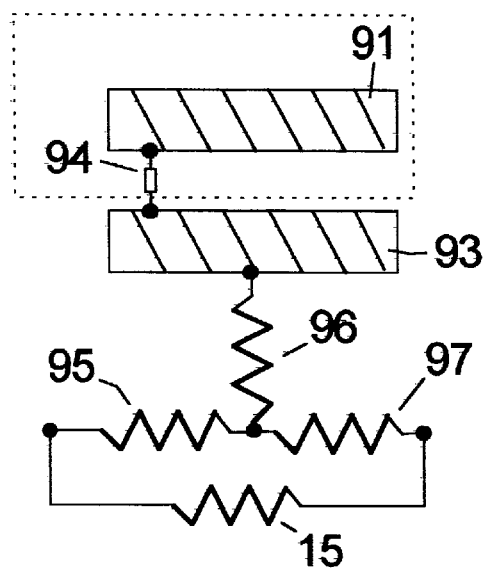
FIG. 7 illustrates a portion of a circuit model for an MR head according to one embodiment of the invention using a center tapped resistance path from two shields which are electrically connected.

In another embodiment of the invention shown in the model of FIG. 7, for a two conductive shield head, a center-tapped thin film resistor model(composed of resistors 95, 97) is connected across the leads of the MR element 15 and the center tap is connected to its conductive shield (S2) 93 through resistor 96. In an alternative embodiment resistor 96 can be replaced with a conductive path. This resistive network clamps the potential of the shield to approximately the mid-point potential of the MR element and so keeps the friction between the media (tape or disk) and the head from charging the MR-shield virtual capacitor. One advantage of this approach is that the MR-shield potential differences are constant and independent of the biasing current direction. Note that a center-tapped resistor can be two separate resistors connected to the shield at the same or different locations. Since the shields are good conductors, the contact location is not generally critical. In this embodiment the two shields are both composed of conductive material.

In alternative embodiments of the invention corresponding to FIGS. 5, 6 or 7 where there are two conductive shields in the tranducer can either be left electrically insulated from each other or they can be connected by noninsulating material 94 which can either be conductive or resistive. A conductive connection essentially shorts the shields together. The first shield S1 is shown as element 91 in FIGS. 5–7.

Figure 8:
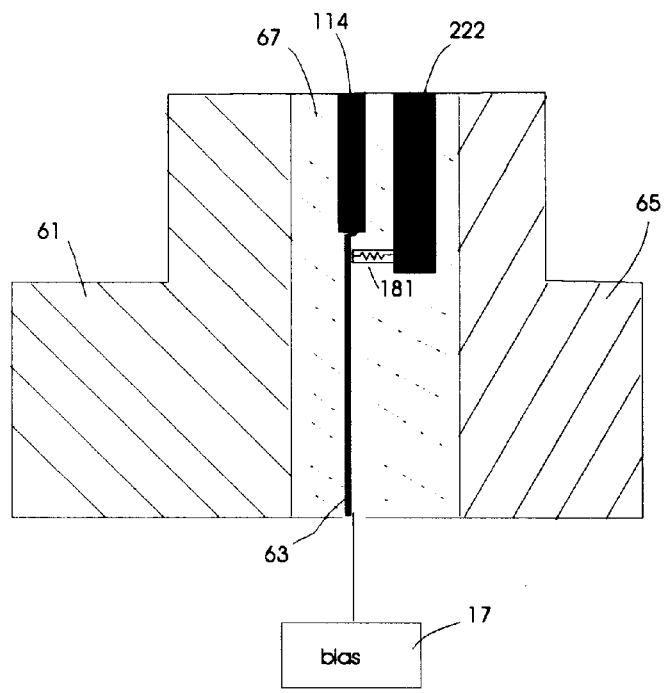
FIG. 8 illustrates a cutaway view of an MR head using ferrite for a first shield and a separate electrically conductive element for the S2 shield and a resistive path from the S2 shield to the MR lead according to an embodiment of the invention.

FIG. 8 illustrates a cutaway side view of an MR head using ferrite for a first (nonelectrically conducting) shield 61 and a separate electrically conductive element for a second shield 222 and a resistive path 181 from the second shield to the more positive MR lead 63 according to an embodiment of the invention which generally corresponds to the model of FIG. 5. (Note that in this view the more negative MR lead is not shown since it would be directly behind the more positive MR lead.) The resistive path 181 can be a thin film sheet structure or a resistive material deposited in the via hole through the insulating material 67 down to the MR lead 63. In either case a resistive electrical path is provided for charges building up on S2.

The alternative embodiment modeled in FIG. 6 which provides a conductive (near zero resistance) electrical path can be achieved by allowing the S2 shield material to be deposited in the via as the shield is being deposited. In this case the shield material is placed in direct electrical contact with the MR lead 63. Alternatively a conductive material other than the shield material could be deposited in the via prior to depositing the shield. Note that the implementation of the simple resistive and conductive path embodiments for a head with two conductive shields is obtained similarly by connecting the two shields together with a near zero resistance path.

Figure 12:
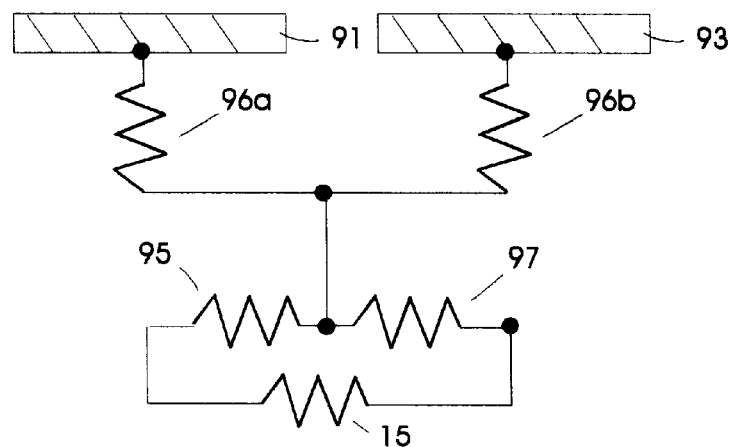
FIG. 12 illustrates a portion of a circuit model for an MR head according to one embodiment of the invention using a separate resistive path from each of two conductive shields to a center tapped resistance across the two leads of the MR element.

FIG. 12 shows an embodiment which can be considered to be a variation of the embodiment of FIG. 7. In FIG. 12 the two shields 91 and 93 are connected through resistive paths 96a and 96b respectively to the center tap of the resistance represented by 95 and 97. There are a large number of connection and resistive networks that can be used to implement the principles of the invention. The principles of the examples in FIGS. 5–7 and 12 immediately yield other combinations using resistors that are common to the paths from the two shields, using conductive connections in the place of some resistive connections, one versus two shields, etc.

Figure 9:
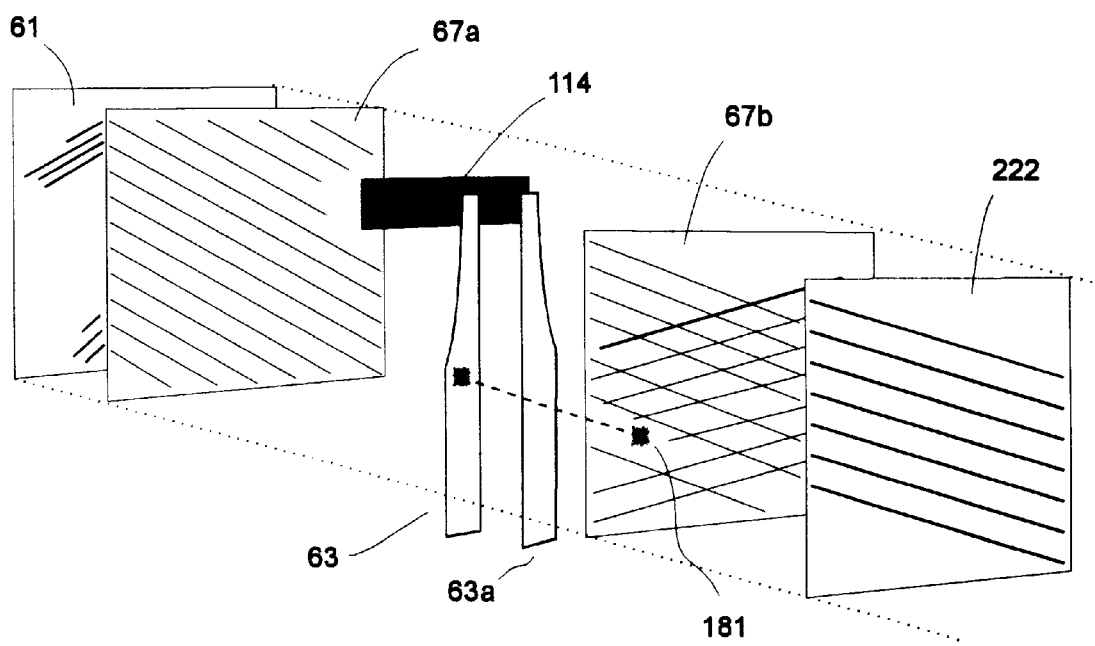
FIG. 9 illustrates a cutaway view of a MR head using ferrite for a first shield and a separate electrically conductive element for the S2 shield and a resistive path from the S2 shield to the MR lead according to an embodiment of the invention.

FIG. 9 shows an exploded view of an embodiment generally corresponding to that of FIG. 8. The ferrite layer 61 is under first insulating layer 67a. The MR element 114 is deposited on the first insulating layer 67a. The two MR leads 63, 63a are deposited at opposite ends of the MR element to span over the MR element and the insulating layer 67a and ultimately be connected outside the head. The second insulating layer 67b follows to cover the MR element and the leads. The via hole is etched into the second insulating layer 67b to provide a space for the contacting material 181 to span from the MR lead 63 through the second insulating layer 67b to make electrical connection with the S2 shield 222. If the via is unfilled when the S2 shield material is deposited, it will fill the via to directly contact the MR lead 63.

Figure 10:
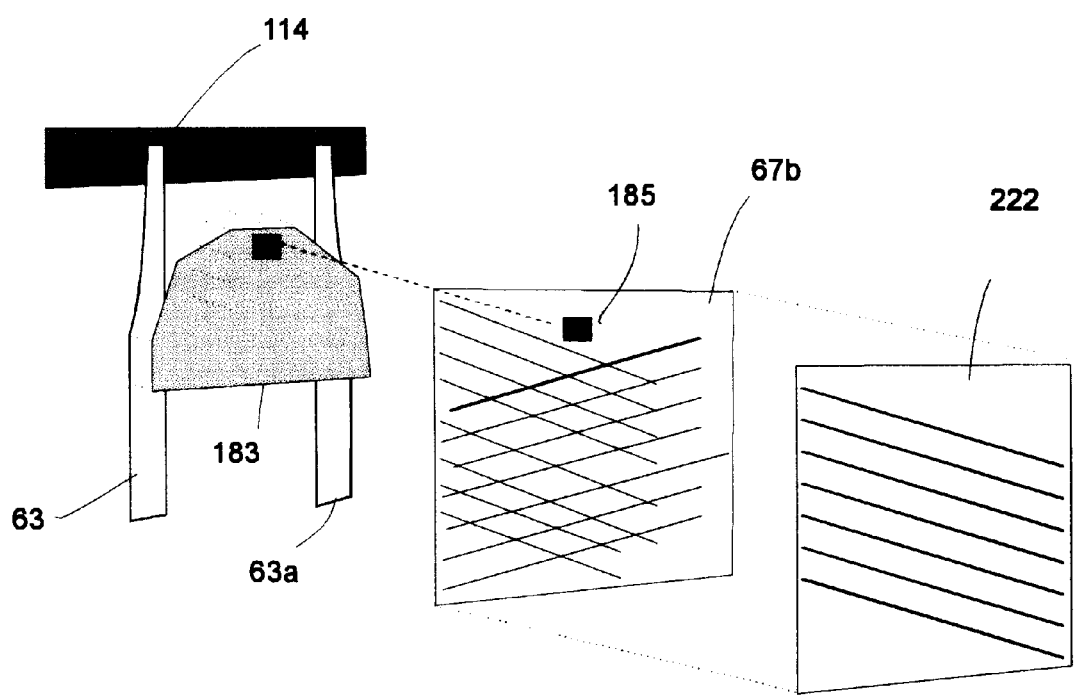
FIG. 10 illustrates an exploded view of an MR head having a single conductive S2 shield and a center-tapped resistive path from the S2 shield to both leads of the MR element according to an embodiment of the invention.

FIG. 10 illustrates an exploded view of an MR head having a single conductive S2 shield and a charge clamp formed by a center-tapped resistive path from the S2 shield to the both MR leads according to an embodiment of the invention. This illustration generally corresponds to the model of FIG. 7. For clarity everything prior to the MR element has been omitted from this illustration. The irregularly-shaped thin film resistive sheet 183 approximately corresponds to three resistors 95, 96, 97 in FIG. 7. The shape of the resistive sheet 183 is somewhat arbitrary and can be selected according to process or material constraints, etc. In this embodiment the material for the resistive sheet 183 is deposited to span across the two MR leads. (Note that the order in which the layers or structures are deposited is not constrained by the invention.) The via hole in the second insulating layer 67b is located to connect to a spot on the resistive sheet that will preferably yield approximately equal resistance from the shield to each lead. The resistance to each lead does not have to be equal for the beneficial result of the invention to be obtained. In fact, the embodiment of FIGS. 5 and 6 can be considered special cases of the FIG. 7 embodiment with various legs of the circuit either opened or shorted. The S2 shield 222 material, which is electrically conductive, is deposited into the via to connect the shield to the resistive network as indicated in the model. The vertical, common leg of the clamp network can be eliminated in a different embodiment of the invention. For this alternative embodiment the resistor 96 is eliminated either by placing the via between resistors 95 and 97. In a preferred embodiment the electrical paths formed by the charge clamp from the shield to the two leads will be substantially equal regardless of whether the resistor 96 is present.

In any of the embodiments the resistive and conductive electrical paths can be thin films made from materials and using structures known in the art to be useful for thin film resistors (such as polysilicon) or conductors. Note that even though metals are considered to be conductive, they have resistance which can be utilized in building the charge clamp. The resistors can also be resistive material deposited into one or more vias (hole in insulator), such as nickel oxide, aluminum rich alumina or doped polysilicon.

According to any of the embodiments, the clamping resistance essentially prevents the voltage on the shield from exceeding about 0.1 volts. Without the clamping resistance voltages on the order of 10 volts or more could be expected.

The reason for providing a finite clamp resistance value is to minimize signal variations which can be caused by intermittent metal smears between MR and shield on the head surface. Such smears could result from fabrication, cleaner tape or data tape. A clamp resistance of 50–150 kohms is generally sufficient. However, modeling shows that clamp resistance should be less than a few megaohms. If such smears are not present or are of sufficiently high resistance, then a single, low resistance connection is sufficient, i.e. less than 50 kohms and typically a few ohms or 10's of ohms.

Some prior art MR heads may have less than a few megaohms of leakage between the MR and shield and, therefore, may not be subject to spiking. Heads that are subject to the spiking problem have higher insulation resistance which allows the tribocharging to reach sufficiently high voltage.

Another embodiment replaces the MR-shield insulator with a slightly conductive material that gives the same resistance specifications, such as nickel oxide (which is already used in spin valve leads). This embodiment requires no changes in the structure of the head and can, therefore, be implemented easily. Note, however, that in this method tribocurrent flows through the MR element itself. It is generally preferable to divert the tribocurrent to the MR leads as is done in other embodiments. The invention can also be used in MR heads in which both S1 and S2 shields are conductors. In this case the above embodiments are applied to both shields rather than just S2. There are several options for making the connections. In particular one option is to connect the two shields together directly and then provide a clamp strap to the lead resistor or resistors. Both shields should preferably be at approximately the same potential.

One advantage of all but one of embodiments of the invention described herein is that the potential clamp diverts head-tape tribocurrent through the more robust shield to the MR leads. There is evidence that under certain conditions this current if not diverted is destructive to the MR elements, so heads made according to the invention will be more robust than prior art heads.

Another advantage of the invention is that it makes the shields more effective for EMI protection. This could result in less noise pickup under some conditions.

MR head structures are typically made in batches by processing wafers in a series of steps in which layers of material are deposited or selectively etched using well known techniques. The various embodiments described above can be incorporated into existing wafer designs and processes for heads by those with ordinary skill in the art.

Figure 1:
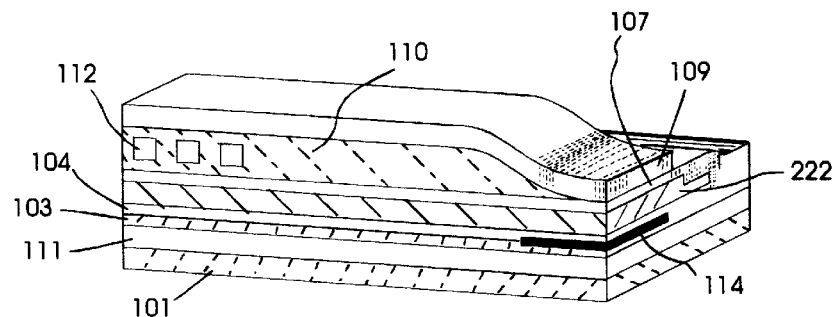
FIG. 1 illustrates a cutaway view of a prior art MR head designed for use in a disk drive.
Figure 11:
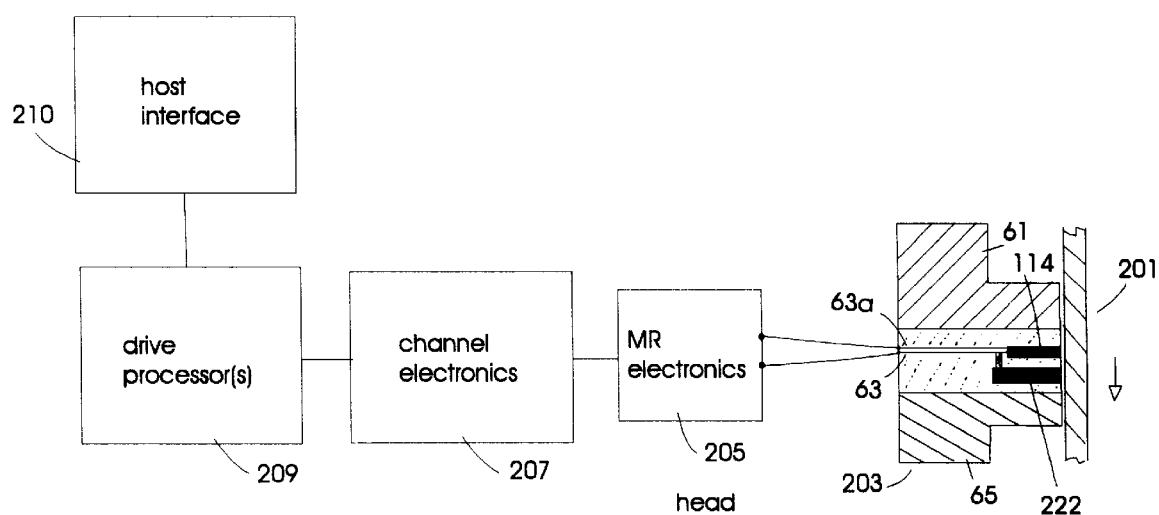
FIG. 11 illustrates a storage system according the invention.
Figure 2:
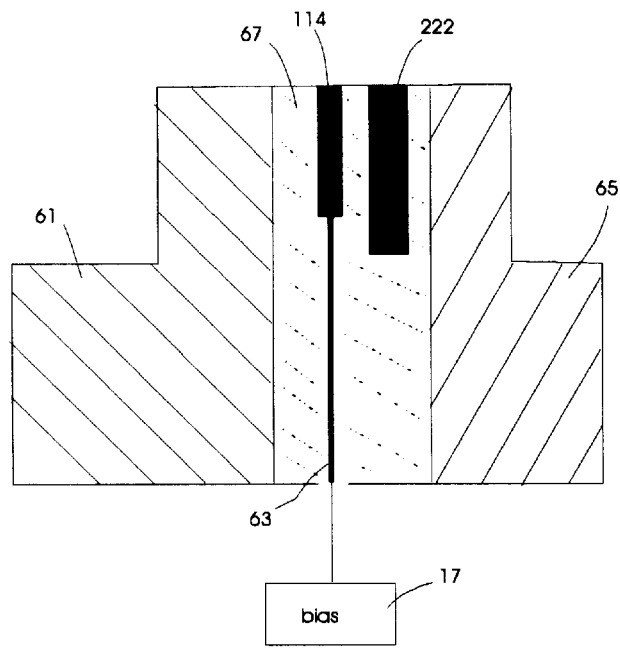
FIG. 2 illustrates a cutaway view of prior art MR head using ferrite for a first shield and a separate element for a second shield.
Figure 3:
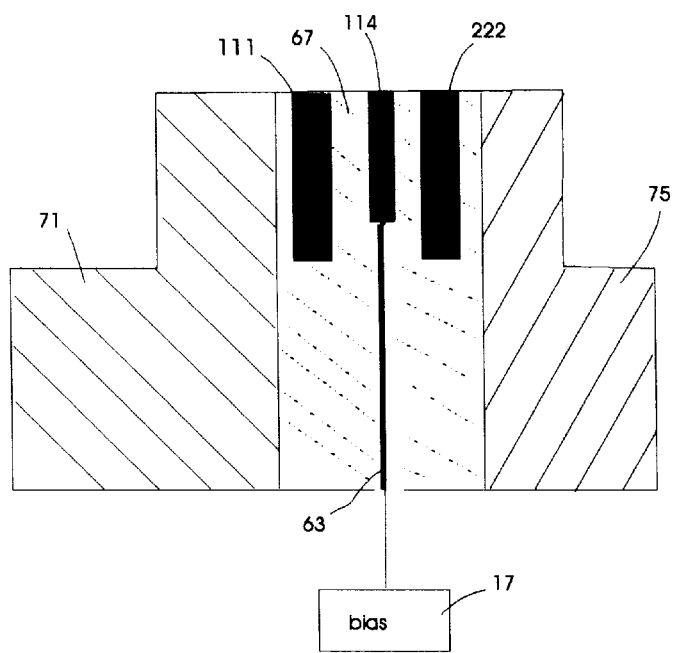
FIG. 3 illustrates a a cutaway view of prior art MR head using separate elements for first and second shields.

FIG. 11 illustrates a data storage system which can either be a tape drive, a rigid disk drive or a flexible disk drive using an MR head according to the invention. Media 201 (either in rigid disk, flexible disk or tape form) is transported over head 203 in a linear direction in the standard way. The MR element 114 has two leads 63, 63a which are connected to the MR electronics 205 which supply proper bias and provide initial processing of the signal. Using the head of the invention requires no changes in the MR electronics 205, the drive processor(s) 209 or the host interface unit 210 as used in the prior art.

The foregoing description of an exemplary embodiment of the invention has been presented for the purposes of illustration and description. It is not intended to be exhaustive or to limit the invention to the precise form disclosed. Many modifications and variations are possible in light of the above teaching.

What is claimed is:

1. A transducer comprising:
    a magnetoresistive element substantially surrounded by electrically insulating material;
    first and second electrically conducting leads from the magnetoresistive element through electrically insulating material to first and second locations on an outside surface of the transducer; and
    a shield substantially separated from the magnetoresistive element by the electrically insulating material, the shield being electrically connected to the first and second conducting leads through first and second resistive paths to provide an electrical path for electric charges to flow from the shield through the first conducting lead to the first location on the outside surface and through the second conducting lead to the second location without flowing through the magnetoresistive element.

2. The transducer of claim 1, wherein the first resistive path from the shield to the first conducting lead includes first and second resistances and the second resistive path from the shield to the second conducting lead includes first and third resistances.

3. The transducer of claim 2, wherein the second and third resistances are approximately equal.

4. The transducer of claim 1 wherein the electrical resistance from the shield to the first conducting lead is substantially equal to the electrical resistance from the shield to the second conducting lead.

5. The transducer of claim 1 further comprising resistive material in electrical connection between first and second leads and the transducer further comprises an electrical connection from a midline of the resistive material to the shield.

6. The transducer of claim 5 wherein electrical connection from a midline of the resistive material to the shield is through a via in insulating material.

7. A transducer comprising:
    first and second magnetic shields composed of electrically conducting material;

a magnetoresistive element disposed between first and second shields with electrically insulating material separating the magnetoresistive element from the first and second shields;

first and second conducting leads from the magnetoresistive element through electrically insulating material to first and second locations on an outside surface of the transducer, the first and second conducting leads being connected through resistive material; and an electrical connection from at least the second shield to a point on the resistive material providing a path for electrical charges to flow from the second shield to first and second locations without flowing through the magnetoresistive element.

8. The transducer of claim 7 wherein the first shield has an electrical connection with the second shield providing a path for electric charges to flow from the first shield to the first and second conducting leads.

9. The transducer of claim 8 wherein an electrical resistance from the second shield to first conducting lead is substantially equal to the electrical resistance from the second shield to second conducting lead.

10. The transducer of claim 8 further comprising resistive material extending between first and second leads and an electrical connection from the resistive material to the second shield at the substantially the midline of the resistive material.

11. The transducer of claim 9 further comprising an electrical connection between the first and second shields.

12. The transducer of claim 7 further comprising a path of noninsulating material forming an electrical connection between the first shield and the second shield.

13. A storage system comprising:

a transducer comprising: a magnetoresistive element substantially surrounded by electrically insulating material; first and second electrically conducting leads from the magnetoresistive element through electrically insulating material to first and second pads on an outside surface of the transducer; first and second shields substantially separated from opposing sides of the magnetoresistive element by the electrically insulating material; and the second shield electrically connected to the first and second pads through resistive to provide a path for electric charges formed on the second shield to be discharged without flowing through the magnetoresistive element; and bias circuitry connected to the first and second pads and the second shield which induces a dc bias voltage between first and second leads and thereby induces a bias voltage on the second shield without inducing a bias current through the second shield.

14. The storage system of claim 13, wherein electrical connection from the shield to the first conducting lead is made through external connections on the transducer.

15. The storage system of claim 13, wherein the transducer comprises a thin film of resistive material extending from the shield to the first and second conducting leads, thereby maintaining a dc voltage on the shield which is between the dc voltage on the first conducting lead and the second conducting lead.

16. The storage system of claim 15 wherein the dc voltage on the shield which is midway between the dc voltage on the first conducting lead and the second conducting lead.

17. The storage system of claim 13 wherein a dc voltage on the second shield is equal to or more positive with respect to the magnetoresistive element.

18. The storage system of claim 13 wherein the second shield is connected to a lower impedance to signal return than the first lead.

* * * * *